US012053991B2

(12) United States Patent
Rietbergen et al.

(10) Patent No.: US 12,053,991 B2
(45) Date of Patent: Aug. 6, 2024

(54) PRINT HEAD FRAME STRUCTURE AND CONTROL

(71) Applicant: Canon Production Printing Holding B.V., Venlo (NL)

(72) Inventors: Mark Rietbergen, Venlo (NL); Johan P. Smits, Venlo (NL); Sjirk H. Koekebakker, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 126 days.

(21) Appl. No.: 17/729,399

(22) Filed: Apr. 26, 2022

(65) Prior Publication Data

US 2022/0355595 A1 Nov. 10, 2022

(30) Foreign Application Priority Data

May 10, 2021 (EP) .................................... 21173166

(51) Int. Cl.

| | |
|---|---|
| ***B41J 2/21*** | (2006.01) |
| ***B41J 2/045*** | (2006.01) |
| ***B41J 11/00*** | (2006.01) |

(52) U.S. Cl.

CPC ......... *B41J 2/2103* (2013.01); *B41J 2/04596* (2013.01); *B41J 11/008* (2013.01)

(58) Field of Classification Search

CPC ...... B41J 11/008; B41J 11/007; B41J 2/2146; B41J 2/155; B41J 2/2103; B41J 2202/08; B41J 2/04596; B41J 13/08; B41J 29/02; B41J 29/393

See application file for complete search history.

(56) References Cited

U.S. PATENT DOCUMENTS

2016/0137447 A1* 5/2016 Smeyers ................ B65H 9/002 271/226

FOREIGN PATENT DOCUMENTS

| | | |
|---|---|---|
| EP | 1 211 073 A1 | 6/2002 |
| EP | 2 627 514 B1 | 1/2019 |
| EP | 3 544 917 B1 | 2/2021 |
| JP | 2013-82145 A | 5/2013 |
| WO | WO 2018/097717 A2 | 5/2018 |

OTHER PUBLICATIONS

European Search Report, issued in EP Application No. 21 17 3166, dated Oct. 25, 2021.

* cited by examiner

*Primary Examiner* — Jannelle M Lebron

(74) *Attorney, Agent, or Firm* — Birch, Stewart, Kolasch & Birch, LLP

(57) ABSTRACT

The invention relates to a print system comprising at least two page-wide arrays of ink jet print heads, positioned in a frame over a conveyor belt for transporting a substrate underneath the arrays, three sensors for reading markers on the conveyor belt and a control unit that is configured to derive control signals from encoder signals of the three sensors. Two sensors are directly connected to the frame and a third sensor is connected to one of the said two sensors by an element with virtually no thermal expansion, extending in transport direction. The control signals, comprising signals for controlling a transport speed of the conveyor belt and line pulses for the at least two print heads, are derived in such a way that an amount of thermal expansion of the frame is determined and an absolute print resolution is maintained.

11 Claims, 2 Drawing Sheets

PRINT HEAD FRAME STRUCTURE AND CONTROL

BACKGROUND OF THE INVENTION

1. Field of the Invention

The invention relates to a print system comprising at least two page-wide arrays of ink jet print heads, positioned in a frame over a conveyor belt for transporting a substrate underneath the arrays, sensors for reading markers on the conveyor belt and a control unit that is configured to derive control signals from encoder signals of the sensors.

2. Description of the Related Art

Print systems comprising ink jet print heads are ubiquitous nowadays. The productive systems comprise a page-wide array of print heads which are positioned over a substrate that is transported underneath the array, exposing the full substrate surface to a side of the print heads from which ink drops emanate. The ink drops make dots on the substrate and are generated by print elements, either driven by a thermal or a piezo actuator, the elements ending in nozzles, a.k.a. droplet ejection ports, in a nozzle plate. Due to the size of the print elements and the required density of nozzles, a print head usually has more than one row of nozzles, with the result that ink dots that are on a line perpendicular to the transport direction of the substrate, are not fired at the same timing, but slightly before or after one another. Furthermore, a colour print system comprises a page-wide array for every colorant, usually at least four in the colours cyan, magenta, yellow and black, although more colorants and other liquids are also possible. These arrays are placed one after another in a frame such that a substrate may receive ink drops of different colours to build up a printed image. In this way, the print registration in transport direction, i.e. the positioning of ink dots relative to each other, is determined by the distance between the arrays, the distance between the nozzle rows within an array, the transport velocity of the substrate and the timing of the ink drop generation. The assembly of a number of page-wide arrays and the frame on which they rest, is called a print station. It is noted that the term "print head", "print" and derivatives thereof are to be understood to include any device or technique that deposits or creates material on a substrate in a controlled manner.

A common way to transport the substrate is to place it on a conveyor belt that is moved in the required direction. The conveyor belt comprises markers that are read by sensors connected to the frame of the print station. Two sensors attached to the frame may be used to determine the timing of the substrate position. Due to changes in environment temperature, the distance between print head arrays may vary due to thermal expansion of the frame. Depending on the composition and the material of the frame, this expansion may amount several hundreds of microns, which is larger than acceptable for accurate registration. A way to deal with this problem is described in patent application WO2018/097717, where a number of encoder pulses between the two sensors is kept constant, thus compensating a possible thermal expansion. However, there is no absolute reference for determining the amount of expansion and the print resolution may vary. Another way to deal with the problem of thermal expansion of the frame is to place the print head arrays in a thermally stable construction, e.g. made of carbon fibre reinforced beams. This is a rather expensive solution, but in absence of thermal expansion, the print resolution is maintained.

The inventors of the present invention have found that there is another reason for requiring maintenance of the print resolution. This is the fact that most print heads have more than one nozzle row. Since the print heads are usually thermally controlled in order to get a stable drop formation process, the distance between the nozzle rows will not vary with a change of ambient temperature and the timing of the droplets depends only on the velocity of the substrate. This means that thermal expansion of the frame, leading to a varying distance between the print head arrays, is incompatible with the constant temperature of the print heads in the arrays and only the expensive solution remains.

It is therefore an object of the invention to enable the use of a thermally expanding frame for positioning the print head arrays above the conveyor belt and still maintain a fixed print resolution.

SUMMARY OF THE INVENTION

In order to achieve this object, in addition to connecting two sensors directly to the frame, a third sensor is connected to one of the said two sensors by an element with virtually no thermal expansion, extending in transport direction. All three sensors read markers on the conveyor belt and from the difference in timing between the signals of the third sensor and one of said two sensors, an amount of thermal expansion of the frame may be derived. Using the measured thermal expansion, the timing control signals for the different print head arrays are corrected.

Further details of the invention are given in the dependent claims.

In an embodiment, the element connecting the third sensor to one of the two sensors on the frame is a low cost carbon fibre rod. It is known that the thermal expansion of such a carbon fibre rod is very close to zero. Thus, the distance between the third sensor and a first sensor does not vary with temperature, whereas the distance between the two sensors on the frame does vary with temperature, as does the distance between the print head arrays, proportional to their mutual distance. As an alternative, the rod may be made of invar, which is a magnetic material wherein the magnetostriction intrinsically compensates for the thermal expansion, leaving only a very small expansion coefficient, in the order of 2 $\mu m\ K^{-1}\ m^{-1}$.

In an embodiment, the frame is made of low cost metal, such as aluminium or steel. These metals show considerable thermal expansion with thermal expansion coefficients of 23 $\mu m\ K^{-1}\ m^{-1}$ and 12 $\mu m\ K^{-1}\ m^{-1}$ respectively. A measurement of the total amount of thermal expansion by comparing the signals from the three sensors enables a correct determination of the control signals associated with a fixed print resolution.

The invention also pertains to a method for deriving a trigger signal from the three sensors and the position and/or velocity of the substrate.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF EMBODIMENTS

Figure 1:
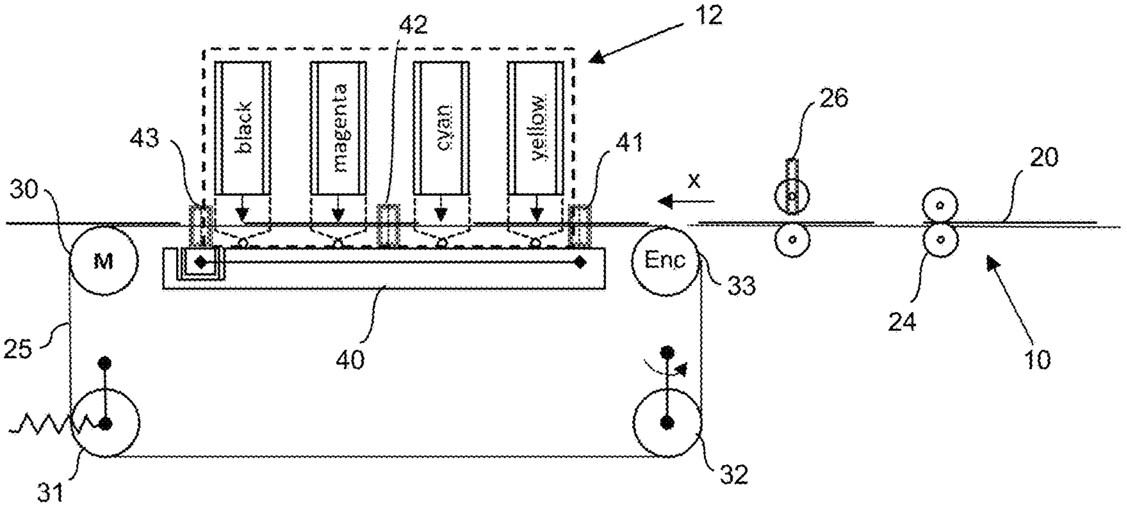
FIG. 1 is a schematic sectional view of a print system according to an embodiment of the invention.

The present invention will now be described with reference to the accompanying drawings, wherein the same or similar elements are identified with the same reference numeral.

The print system shown in FIG. 1 has a sheet supply path 10, a conveyor belt 25 and a print station 12, placed on a beam 40. The sheet supply path 10 is arranged to supply media sheets 20 successively to and past the print station 12, where an image is printed on the top side of each media sheet passing through. The conveyor belt 25 is capable of accommodating a plurality of media sheets 20 at a time and is driven by a motor roller 30. Besides a brake roller 31 and a steering roller 32, an encoder roller 33 from which a belt position signal is derived, using a line pulse multiplier (LPM). This derivation also accounts for a thermal compensation of the belt length.

The sheet supply path 10 includes a pinch 24 formed by at least two pinch rollers forming a nip through which the media sheets 20 pass through. At least one of the pinch rollers is driven for rotation so that the media sheets are advanced in a transport direction x towards the print station 12. A liftable pinch 26 is arranged in the sheet supply path 10 in a position downstream of the pinch 24. The distance between the pinches 24 and 26 in the transport direction x is smaller than the length of the media sheets 20 in that direction, so that the leading edge of the sheet 20 can be clamped in the liftable pinch 26 before the trailing edge of that sheet has left the pinch 24. Accordingly, a continuous transport of the media sheets can be assured.

The beam 40 provides support for up to seven page-wide arrays (PWA) of print heads for jetting ink drops. The shown print station 12 comprises only four of them in the colors cyan, magenta, yellow and black. These PWA's are oriented transverse to the transport direction. Each PWA receives an individual start-of-page signal (SOP) to mark the start of image lines to be printed on the media sheet 20, relative to the leading edge of the sheet. After the SOP, a start-of-line (SOL) is given for each further image line. These signals are derived from the belt position signal that is generated by the encoder roller with LPM in units of 2.64 μm, equivalent to 9600 dpi, and the sensors signals that come from the position sensors 41, 42, and 43. Whereas sensors 41 and 42 are fixed on the beam 40, sensor 43 is mounted on the beam 40 in a way that it can freely move in the transport direction, the x direction. Sensor 43 is connected to sensor 41 by an element that is made of the metal "invar", wherein a magnetostrictive contraction counters a thermal expansion at rising temperatures. Thus, this element shows virtually no thermal expansion. In an alternative embodiment, the element is a low cost carbon fiber rod. Thus, the distance between the sensors 41 and 43 is fixed, in contrast to the distance between sensor 41 and 42, that varies with a varying temperature.

Figure 2:
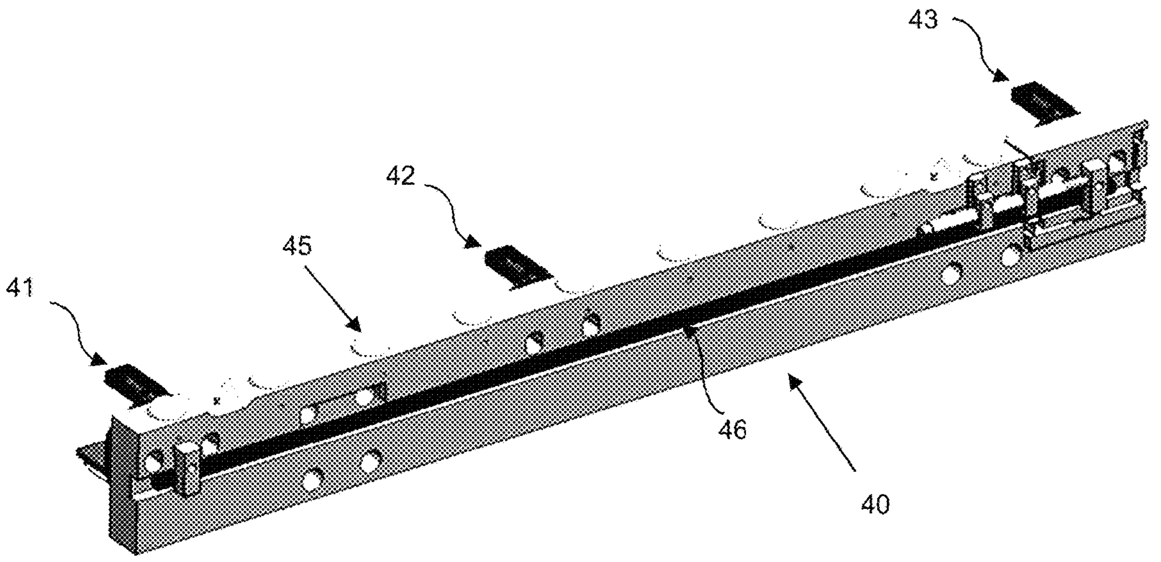
FIG. 2 is an embodiment of the frame of the print station with an indication of the sensor positions.

FIG. 2 shows the beam 40 for positioning the PWA's within the print station 12. This beam, comprising the sensors 41, 42, and 43, is part of the steel frame and is susceptible to thermal expansion with changing ambient temperature. The balls 45 serve as outlining elements for the various arrays that are supported and aligned by the frame. The element 46 that connects the sensors 41 and 43 runs along the full beam and has a length of 560 mm.

The sensors 41 and 42 are 235 mm space apart. From the difference between the signals given by these sensors upon monitoring the markers on a belt that is conveyed underneath these sensors, the amount of thermal expansion of the beam may be derived. The SOP signals for each array that determines the colour-to-colour registration is compensated accordingly. Once a PWA starts printing image lines, the timing between the various lines is determined by the signals stemming from the sensors 41 and 43.

Figure 3:
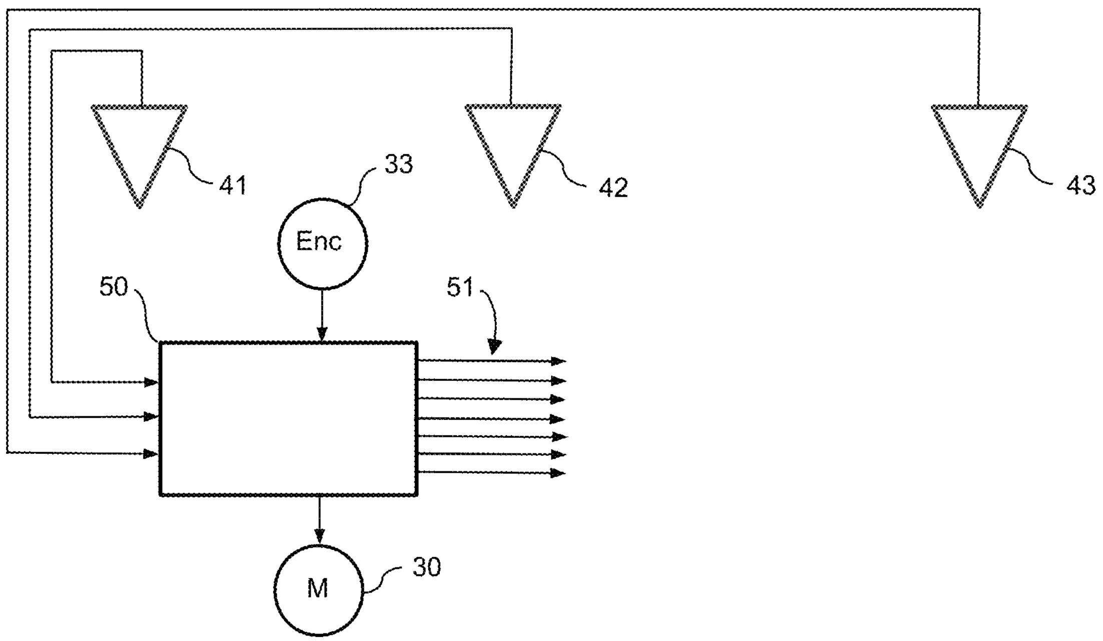
FIG. 3 is a scheme for the derivation of the required control signals.

FIG. 3 shows a scheme for the derivation of the various signals. Three sensors 41, 42, and 43 are shown, each monitoring markers on a the belt 25 that supports the media sheets. The encoder roller 33 gives a signal to a line pulse multiplier for deriving a time-scale that corresponds to a distance of 1/9600 inch or 2.64 micrometer on the belt. For a correct timing of subsequent lines (SOL) the sensors 41 and 43 are used, for a correct timing of the first line (SOP) the sensors 41 and 42 are used. For each PWA, up to seven in total, a separate signal 51 is derived by the calculating unit 50, comprising the line pulse multiplier, from the encoder and the sensor signals. In this way an absolute image resolution is obtained after calibration at a reference temperature, independent of the thermal expansion of the frame that supports the PWA's.

The method of operation comprises the steps of:

capturing the LPM position counter $T_x(n)$ for each belt hole n passing one of the three sensors x;

deriving the measured distances $L_{21}=T_2(n)-T_1(n)$ and $L_{31}=T_3(n)-T_1(n)$;

controlling the belt such that $L_{31}$ is kept constant;

calibrating the distance $L_{21}$ using a test image and saving the value $CR=L_{21}/L_{31}$;

scaling the distance for starting SOP for a PWA at a temperature T in operation by a factor $SF(T)=L_{21}(T)/L_{31}(T)*1/CR$;

The skilled person will recognise that other embodiments are possible within the scope of the appended claims.

The invention claimed is:

1. A print system comprising at least two page-wide arrays of ink jet print heads, positioned in a frame over a conveyor belt for transporting a substrate underneath the arrays in a transport direction, three sensors for reading markers on the conveyor belt including a first sensor, a second sensor and a third sensor spaced in the transport direction, and a control unit that is configured to derive control signals from encoder signals of the three sensors, wherein the first sensor and second sensor are directly connected to the frame and the third sensor is connected to the first sensor by an element having a coefficient of thermal expansion less than a coefficient of thermal expansion of the frame.

2. A print system according to claim 1, wherein the at least two print heads comprise at least two rows of nozzles.

3. A print system according to claim 1, wherein the element connecting the third sensor is an invar rod.

4. A print system according to claim 1, wherein the element connecting the third sensor is a carbon fiber rod.

5. A print system according to claim 1, wherein the frame is made of steel.

6. A print system according to claim 5, wherein the element connecting the third sensor is a carbon fiber rod.

7. A print system according to claim 5, wherein the element connecting the third sensor is an invar rod.

8. A print system according to claim 5, wherein the element has no thermal expansion.

9. A print system according to claim 1, wherein the control signals comprise signals for controlling a transport speed of the conveyor belt and line pulses for the at least two print heads.

10. A print system according to claim 9, wherein the control unit is further configured to derive an amount of thermal expansion of the frame from the encoder signals to maintain an absolute print resolution.

11. A method for deriving control signals for printing an image in a print system comprising at least two page-wide arrays of ink jet print heads, positioned in a frame over a conveyor belt for transporting a substrate underneath the arrays in a transport direction, three sensors for reading markers on the conveyor belt including a first sensor, a second sensor and a third sensor spaced in the transport direction and a control unit that is configured to derive control signals from encoder signals of the three sensors, wherein the first sensor and second sensor are directly connected to the frame and the third sensor is connected to the first sensor by an element with having a coefficient of thermal expansion less than a coefficient of thermal expansion of the frame the method comprising the steps of:

starting printing for a page-wide array based on a delay derived from a distance between the two sensors directly connected to the frame and continuing printing further lines by the page-wide array based on a delay derived from a distance between the third sensor and the sensor connected to the element with virtually no thermal expansion.

* * * * *